(12) United States Patent
Tsirkin

(10) Patent No.: US 9,160,659 B2
(45) Date of Patent: Oct. 13, 2015

(54) PARAVIRTUALIZED IP OVER INFINIBAND BRIDGING

(71) Applicant: Red Hat Israel, Ltd., Raanana (IL)

(72) Inventor: Michael Tsirkin, Yokneam Yllit (IL)

(73) Assignee: Red Hat Israel, Ltd., Raanana (IL)

( * ) Notice: Subject to any disclaimer, the term of this patent is extended or adjusted under 35 U.S.C. 154(b) by 211 days.

(21) Appl. No.: 13/777,891

(22) Filed: Feb. 26, 2013

(65) Prior Publication Data

US 2014/0241355 A1     Aug. 28, 2014

(51) Int. Cl.
| | | |
|---|---|---|
| H04L 12/56 | (2006.01) | |
| H04J 3/24 | (2006.01) | |
| G06F 21/00 | (2013.01) | |
| H04L 12/721 | (2013.01) | |
| H04L 12/931 | (2013.01) | |

(52) U.S. Cl.
CPC .............. *H04L 45/72* (2013.01); *H04L 49/358* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 6,459,698 | B1 * | 10/2002 | Acharya ........................ | 370/392 |
| 2004/0062275 | A1 * | 4/2004 | Siddabathuni ................. | 370/474 |
| 2010/0095045 | A1 * | 4/2010 | Lambeth et al. .................. | 711/6 |

OTHER PUBLICATIONS

The TCP/IP Guide, DHCP Message Format (Sep. 20, 2005), available at http://www.tcpipguide.com/free/t_DHCPMessageFormat.htm.*

Infiniband Architecture Release 1.2.1, vol. 1—General Specifications; Chapter 3: Architectural Overview: cs.infinibandta.org/document/dl/7143 (Nov. 2007).
Message to gmane.linux.network newsgroup at http://permalink.gmane.org/gmane.linux.network/240612 (Aug. 20, 2012).
Ayoub, A., "Ethernet Services over IPoIB", (Mar. 2012), Retrieved from OpenFabrics Alliance website: https://www.openfabrics.org/ofa-documents/presentations/doc_download/510-ethernet-tunneling-over-ipoib.html (Mar. 2012).
Request for Comments: 4391 by Internet Engineering Task Force, http://tools.ietf.org/pdf/rfc4391.pdf (Apr. 2006).
Request for Comments: 4392 by Internet Engineering Task Force, http://tools.ietf.org/pdf/rfc4392.pdf (Apr. 2006).
Request for Comments: 4755 by Internet Engineering Task Force, http://tools.ietf.org/pdf/rfc4755.pdf (Dec. 2006).
Virtio: An I/O virtualization framework for Linux: http://www.ibm.com/developerworks/library/I-virtio/ (Jan. 29, 2010).
Co-pending U.S. Appl. No. 13/766,340, filed Feb. 13, 2013.

* cited by examiner

*Primary Examiner* — Kiet G Tang
(74) *Attorney, Agent, or Firm* — Lowenstein Sandler LLP

(57) ABSTRACT

Systems and methods for paravirtualized Internet Protocol over Infiniband (IPoIB) bridging for virtual machines. An example method may comprise associating, by a hypervisor executing on a host computer system, an Infiniband (IB) interface of the host computer system with a paravirtualized IPoIB interface of a virtual machine executing on the host computer system; receiving, via the paravirtualized IPoIB interface, a paravirtualized IPoIB packet originated by the virtual machine, the paravirtualized IPoIB packet comprising an IP packet and a first header including an IPoIB hardware address; translating the paravirtualized IPoIB packet into an IPoIB frame comprising the IP packet and a second header including the IPoIB hardware address; and forwarding the IPoIB frame via the IB interface to one of: an IB switch, an external IB node.

25 Claims, 6 Drawing Sheets

PARAVIRTUALIZED IP OVER INFINIBAND BRIDGING

TECHNICAL FIELD

The present disclosure is generally related to computer networking, and is more specifically related to systems and methods for paravirtualized Internet Protocol over Infiniband (IPoIB) bridging.

BACKGROUND

Infiniband (IB) architecture developed by the Infiniband Trade Association (IBTA) defines a System Area Network (SAN) for interconnecting processor nodes and input/output (I/O) nodes through an IB fabric made of cascaded switches. Each IB node or switch may attach to a single or multiple switches or directly to another IB node or switch. An IB node connects to the fabric via a host channel adapter. Two or more IB subnets may be interconnected by one or more IB routers.

An IB endpoint may be identified by a queue pair number (QPN) and a port identifier. The latter may include a local identifier (LID) and a global identifier (GID). A LID is a 16-bit value that may be assigned when the corresponding port becomes active. A GID is a 128-bit value that may be formed by concatenating a 64-bit IB subnet prefix and a 64-bit GUID (Global Unique Identifier). Both GID and LID may be assigned by a subnet manager, which is a component performing configuration and control of the subnet.

IB architecture supports several methods of data transfer, also referred to as IB transports, including unreliable datagram, reliable datagram, reliable connected, and unreliable connected. Unreliable datagram mode is universally supported by all IB nodes, and hence is used for Internet Protocol over Infiniband (IPoIB) implementation defined in RFC-4391 and RFC-4392 by Internet Engineering Task Force (IETF). Reliable connected and unreliable connected are commonly referred to as Infiniband Connected Mode (CM). The latter mode may also be used for IPoIB implementation, as defined in RFC-4755.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
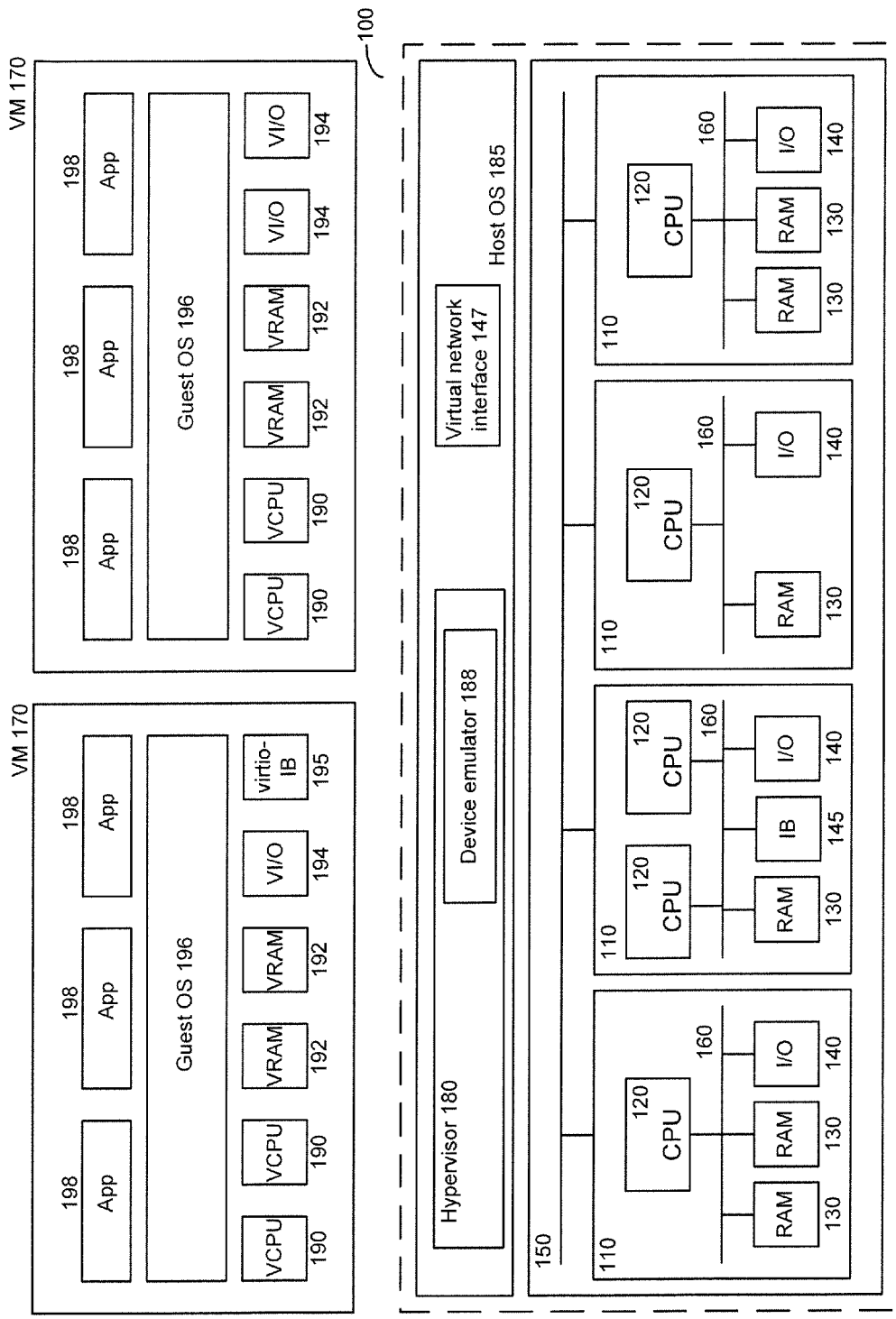
FIG. 1 depicts a high-level component diagram of an example host computer system, in accordance with one or more aspects of the present disclosure.

Described herein are methods and systems for paravirtualized Internet Protocol over Infiniband (IPoIB) bridging. The methods and systems described herein may be used, for example, by virtual machines running on a host computer system equipped with one or more Infiniband (IB) interfaces.

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

The term "paravirtualization" refers to a virtualization technique that presents to virtual machines an interface that is similar but not identical to that of the underlying hardware, with the purpose of improving the overall system performance, e.g., by moving to the user space some operations that in the absence of paravirtualization would have to be performed in the kernel space.

IPoIB protocol implementations described in RFC-4391, RFC-4392, and RFC-4755 by Internet Engineering Task Force (IETF) provide standardized IP encapsulation over IB fabric, thus allowing transparent execution of socket-based applications by routing IP packets over IB. An IPoIB frame includes an IB header, an IPoIB header, an IP header, and a payload. Hence, to allow IP-based communications for virtual machines running on a host having an IB interface, the hypervisor would need to set up OSI (Open System Interconnection) layer 3 routing for IP packets originated by the virtual machines, thus creating an administrative burden and degrading the overall system performance.

To eliminate the need for OSI layer 3 routing in the above described scenario, the present disclosure provides systems and methods for paravirtualized IPoIB bridging for virtual machines. The systems and methods described herein allow OSI layer 2 bridging between the IB interface of the host and virtual IB interfaces created by the virtual machines. Various aspects of the above referenced methods and systems are described in more details herein below by way of examples, rather than by way of limitation.

FIG. 1 depicts a high-level component diagram of one illustrative embodiment of a multi-processor computer system 100 in accordance with one or more aspects of the present disclosure. The computer system 100 may include one or more interconnected nodes 110. Each node 110 may in turn include one or more physical processors 120 communicatively coupled to memory devices 130 and input/output (I/O) devices 140. At least one of the I/O devices may be represented by an IB host channel adapter 145 connected to an IB fabric (not shown in FIG. 1).

"Physical processor" or "processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may be referred to as a "central processing unit" (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect to a system area network 150. Local connections within each node 110, including the connections between a processor 120 and a memory 130 and between a processor 120 and an I/O device 140 may be provided by one or more local buses 160 of a suitable architecture.

Computer system 100 may run one or more virtual machines 170, by executing a software layer 180, often referred to as "hypervisor," above the hardware and below the virtual machines, as schematically shown in FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 190, virtual memory 192, virtual I/O devices 194, and paravirtualized IPoIB interfaces 195.

A virtual machine 170 may include multiple virtual processors 190. Processor virtualization may be implemented by the hypervisor 180 scheduling time slots on one or more physical processors 120 such that from the guest operating system's perspective those time slots are scheduled on a virtual processor 190. A virtual machine 170 may execute a guest operating system 196 which may utilize the underlying virtual devices 190, 192, 194, and 195. One or more applications 198 may be running on a virtual machine 170 under the guest operating system 196.

A paravirtualized IPoIB interface 195 may be created by a virtual machine 170 for transporting paravirtualized IPoIB packets originated by the virtual machine 170 to the host IB interface 145 via the hypervisor 180, and vice versa. In some implementations, operation of the paravirtualized IPoIB interface 195 may be at least partially compliant with Virtio networking virtualization de facto standard. A device emulator 188 may be executed by the hypervisor 180 to emulate a network interface device to the paravirtualized IPoIB interface 195 of the virtual machine 170, as described in more details herein below with references to FIGS. 2-3.

Figure 2:
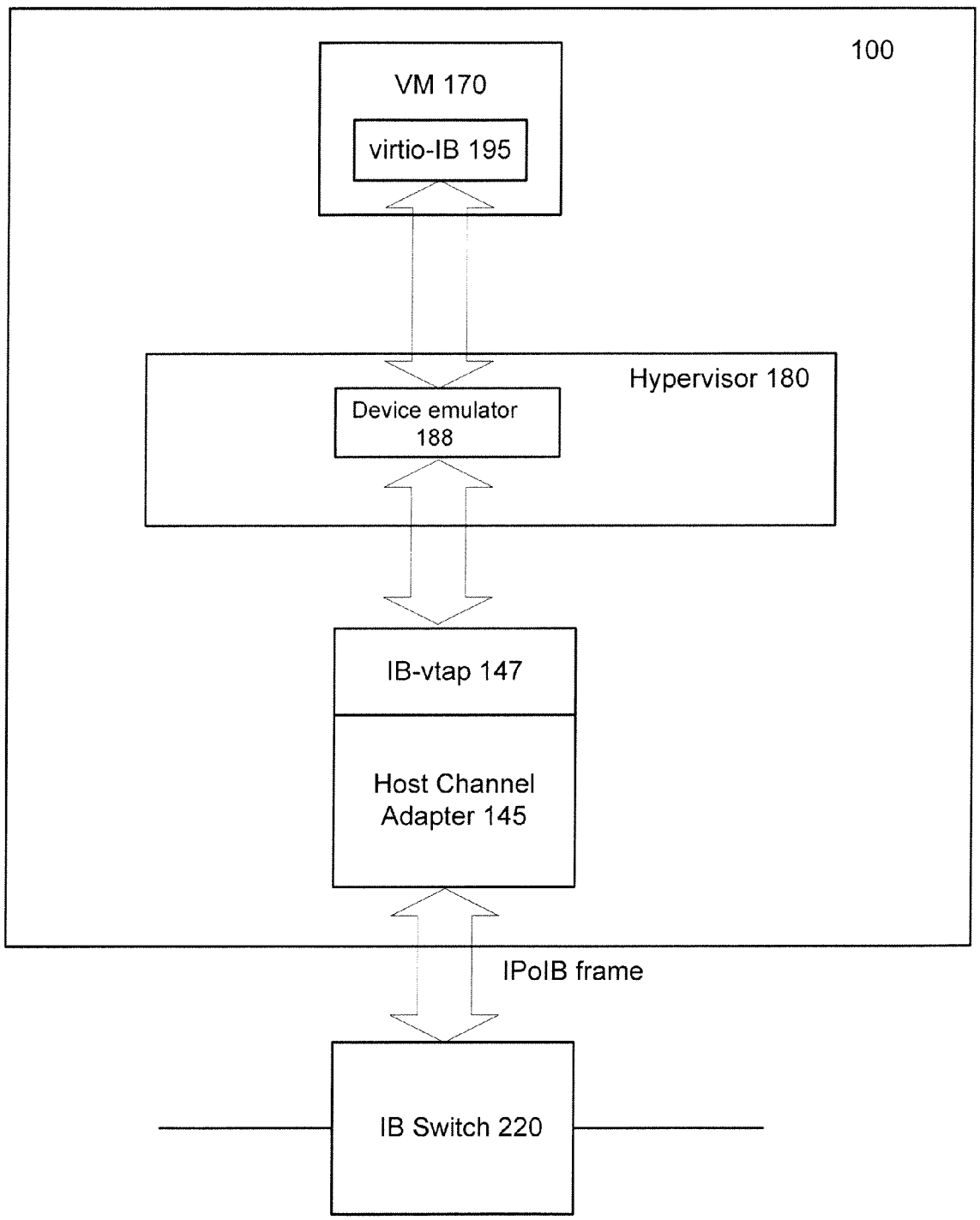
FIGS. 2-3 schematically illustrate examples of implementing various methods for paravirtualized IPoIB bridging for virtual machines executing on the host computer system, in accordance with one or more aspects of the present disclosure.
Figure 3:
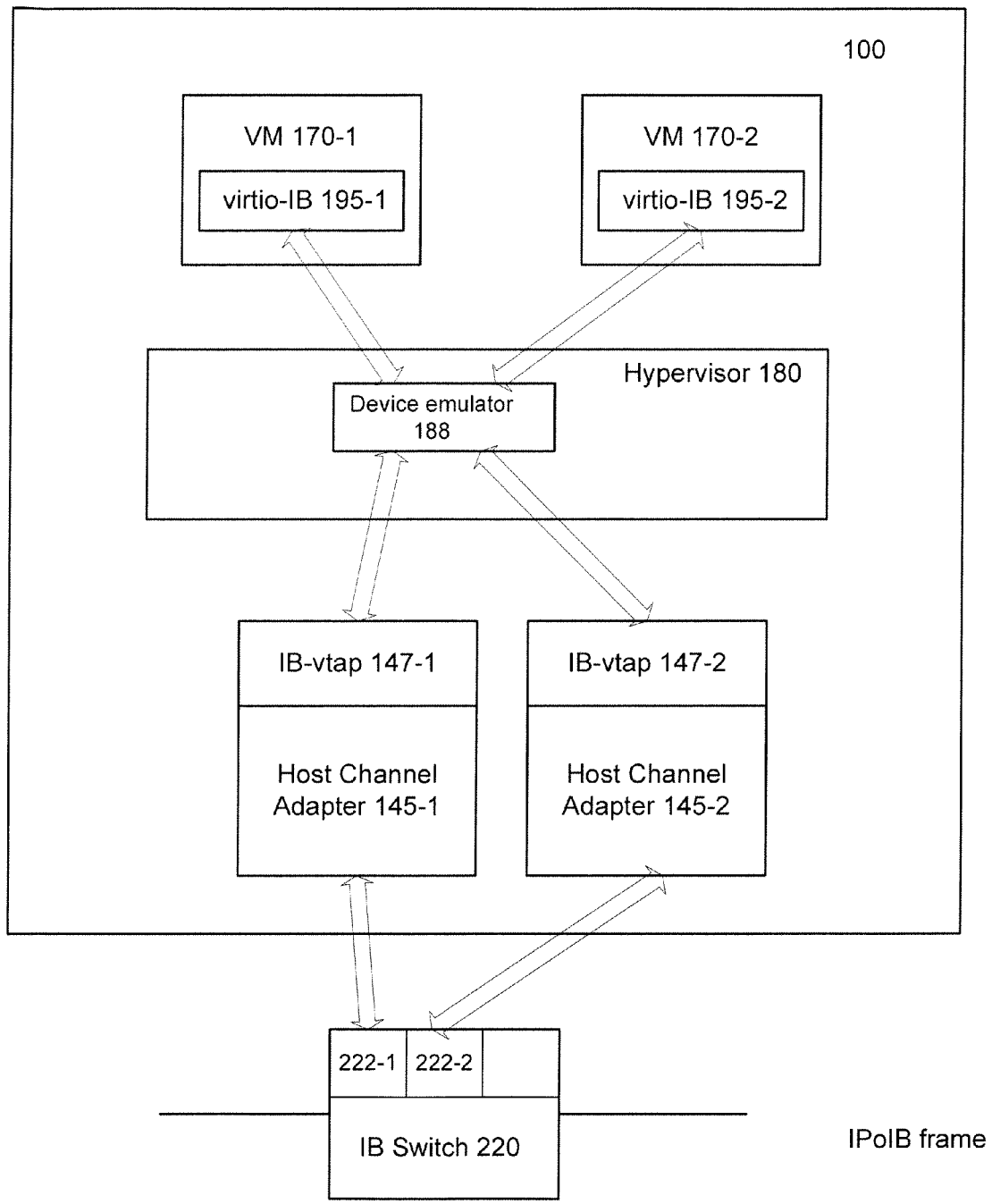

FIGS. 2-3 schematically illustrate examples of implementing various methods for paravirtualized IPoIB bridging performed by the host computer system 100 in accordance with one or more aspects of the present disclosure. Referring to FIG. 2, in the host computer system 100, a virtual network interface 147 may be defined and associated with the IB interface 145. The kernel of the host computer system 100 may transport IPoIB frames between the physical IPoIB interface 145 and the virtual network interface 147.

In one example, the virtual network interface 147 may be exclusively associated with the IB interface 145, i.e., associating the virtual network interface 147 with the IB interface 145 may preclude other virtual network interfaces from associating with the IB interface 145. In another example, each of two or more virtual network interfaces 147 may be exclusively associated with the respective IB interface 145 of two or more IB interfaces of the host computer system 100, as schematically illustrated by FIG. 3.

Upon associating, the IB interface 145 may communicate its queue pair number (QPN) and a port identifier to the virtual network interface 147. The port identifier may include a local identifier (LID) and a global identifier (GID) which may be assigned by the IB subnet manager. The virtual network interface 147 may communicate the QPN and port number to the virtual machine 170 as the hardware address associated with the paravirtualized IPoIB interface 195.

Upon associating, the IB interface 145 may also communicate to the virtual network interface 147 its device capabilities, including maximum transmission unit (MTU) and/or TCP segmentation offloading (TSO). MTU refers to the size of the largest data unit that may be transmitted by a given communication interface. TSO refers to increasing the throughput of high-bandwidth network connections by queuing large outbound buffers and letting the network interface split the buffers into multiple network frames of a smaller size. The virtual network interface 147 may communicate the device capabilities, including the MTU and/or TSO to the virtual machine as the device capabilities associated with the paravirtualized IPoIB interface 195.

A device emulator 188 may be executed by the hypervisor 180 to emulate a network interface device to the paravirtualized IPoIB interface 195 of the virtual machine 170, by translating IPoIB frames received by the IB interface 145 into paravirtualized IPoIB packets and forwarding the latter to the paravirtualized IPoIB interface 195, and/or translating paravirtualized IPoIB packets received by paravirtualized IPoIB interface 195 into IPoIB frames and forwarding the latter to the IB interface 145 via the virtual network interface 147. Both an IPoIB frame and the corresponding paravirtualized IPoIB packet may include a payload (represented by an IP packet) and a header comprising one or more IPoIB hardware addresses. Communications between the device emulator 188 and the paravirtualized IPoIB interface 195 may be facilitated by one or more buffers, software interrupts, and callback functions.

In certain implementations, a tap-like software interface may be implemented by the virtual network interface 147. Tap refers to a virtual Ethernet device having two interfaces: a character device interface accessible by user space applications and a virtual device interface accessible by the kernel. Thus, the host computer system may associate the virtual network interface 147 with a file descriptor accessible by the device emulator 188, so that the latter may open a file identified by the file descriptor and use it for sending and receiving IPoIB frames to and from the virtual network interface 147.

For delivering IPoIB frames received by the IB interface 145 and addressed to the virtual machine 170, the device emulator 188 may, responsive to reading an IPoIB frame from the file identified by the file descriptor associated with the virtual network interface 147, translate the IPoIB frame into a paravirtualized IPoIB packet and trigger an interrupt in the virtual machine 170. Responsive to receiving the interrupt, the virtual machine 170 may read the paravirtualized IPoIB packet via a buffer associated with the paravirtualized IPoIB interface 195.

When sending data over the paravirtualized IPoIB interface 195, the virtual machine 170 may write the data into a buffer associated with the paravirtualized IPoIB interface 195 and signal the device emulator 188. The latter may read the paravirtualized IPoIB packet from the buffer, translate the frame into an IPoIB frame, and deliver the IPoIB frame to the virtual network interface 147 by writing the IPoIB frame to the file identified by the file descriptor associated with the virtual network interface 147. The IB interface 145 may then transmit the IPoIB frame to an IB switch 220 or an external IB node (not shown in FIG. 2) for consequent delivery to the destination address. In certain implementations, the host computer system may select the unreliable datagram (UD) mode or connected mode (CM) for transmitting the IPoIB frame via the IB interface 145, depending on the size of the paravirtualized IPoIB packet, the checksum of the paravirtualized IPoIB packet, and/or administrative preferences represented by the corresponding configuration parameter value.

In one example, two virtual machines 170-1 and 170-2 may be running on the host computer system 100, as schematically illustrated by FIG. 3. Paravirtualized IPoIB interfaces 195-1 and 195-2 may be defined by the respective virtual machines 170-1 and 170-2 for transporting network frames originated by the respective virtual machines to the host IB interfaces 145-1 and 145-2 via the hypervisor 180, and vice versa. A device emulator 188 may be executed by the hypervisor 180 to emulate a network interface device to the paravirtualized IPoIB interfaces 195-1 and 195-2.

In the host computer system 100, virtual network interfaces 147-1 and 147-2 may be defined and associated with the IB interfaces 145-1 and 145-2. In one example, each of the two virtual network interfaces 147-1 and 147-2 may be exclusively associated with the respective IB interface 145-1 and 145-2 of the host computer system 100. The kernel of the host computer system 100 may transport IPoIB frames between the physical IPoIB interfaces 145-1 and 145-2, and the respective virtual network interfaces 147-1 and 147-2.

When sending data over the paravirtualized IPoIB interfaces 195-1 and 195-2, each of the virtual machines 170-1 and 170-2 may write the data into a buffer associated with the respective paravirtualized IPoIB interface 195-1 or 195-2 and signal the device emulator 188. The latter may read the paravirtualized IPoIB packet from the buffer, translate the frame into an IPoIB frame, and deliver the IPoIB frame to the virtual network interface 147-1 or 147-2 associated with the paravirtualized IPoIB interface 195-1 or 195-2, by writing the IPoIB frame to the file identified by the file descriptor associated with the virtual network interface 147-1 or 147-2. The IB interface 145-1 or 145-2 may then transmit the IPoIB frame to the respective port 222-1 or 222-2 of an IB switch 220 or to an external IB node (not shown in FIG. 3) for consequent delivery to the destination address.

In certain implementations, IPoIB frames originated by a virtual machine and addressed to another virtual machine running on the same host computer system may be transmitted to an IB switch and then reflected by the IB switch back to the host computer system 100. Alternatively, IPoIB frames originated by a virtual machine and addressed to another virtual machine running on the same host computer system may be transmitted by the host computer system 100 directly to the appropriate virtual network interface associated with the paravirtualized IP interface of the destination virtual machine.

Figure 4:
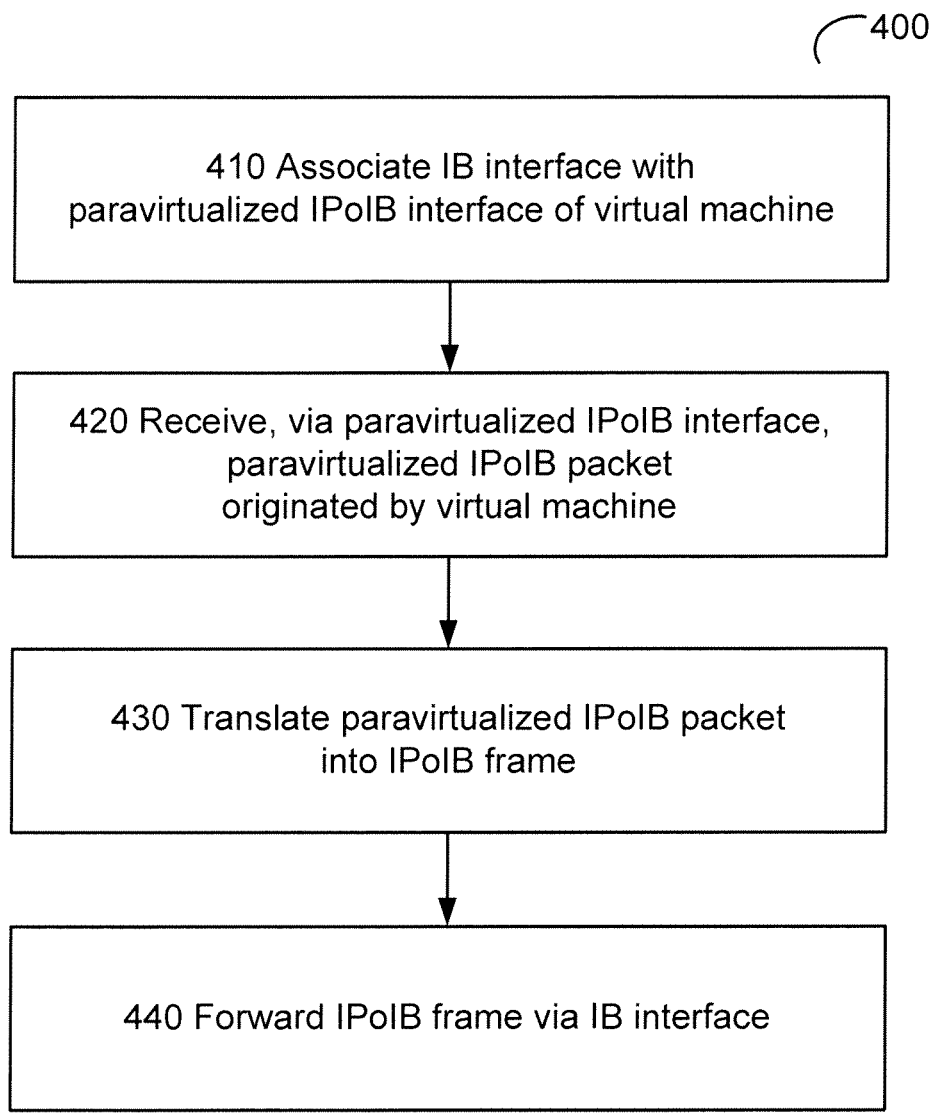
FIGS. 4-5 depict flow diagrams of the methods for paravirtualized IPoIB bridging for virtual machines executing on the host computer system, in accordance with one or more aspects of the present disclosure.
Figure 5:
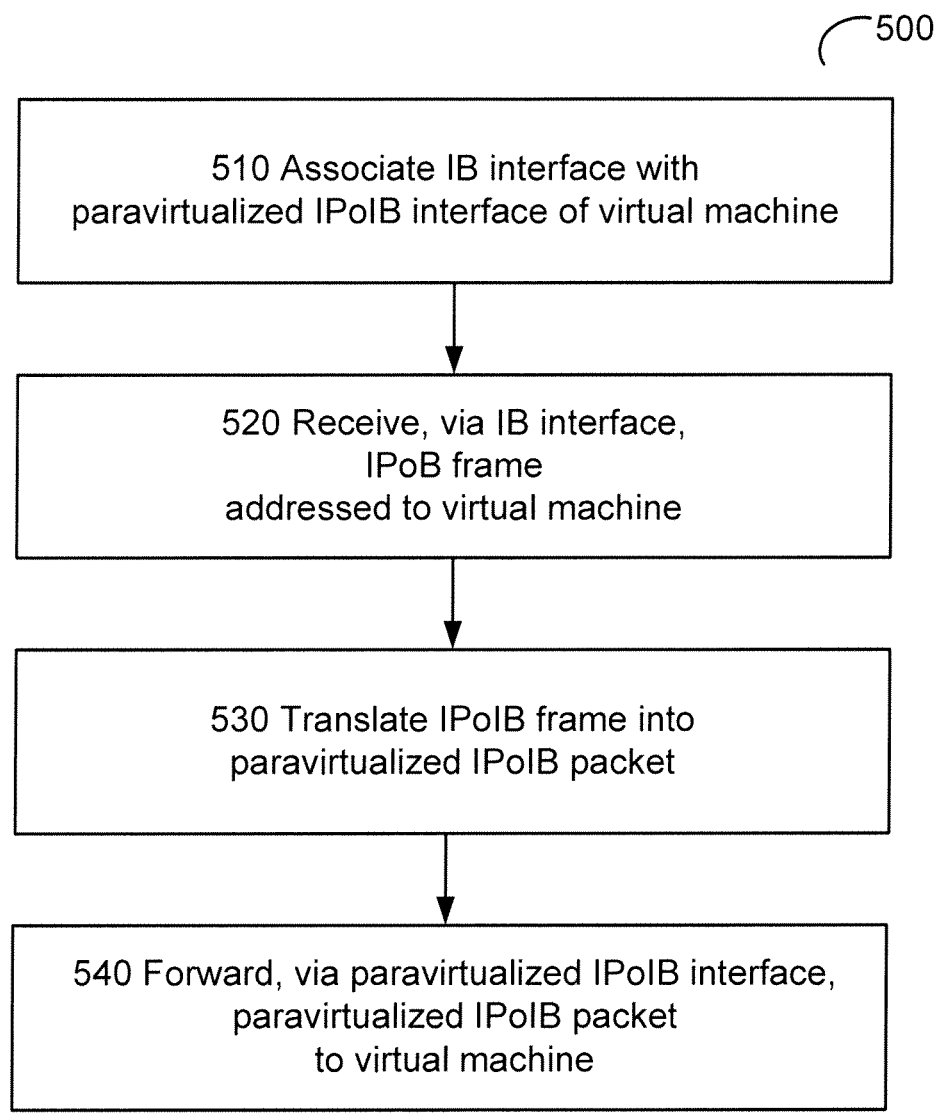

FIGS. 4-5 depict flow diagrams of methods for paravirtualized IPoIB bridging for virtual machines, in accordance with one or more aspects of the present disclosure. The methods 400 and 500 may be performed by a computer system that may comprise hardware (e.g., circuitry, dedicated logic, and/or programmable logic), software (e.g., instructions executable on a computer system to perform hardware simulation), or a combination thereof. The methods 400 and 500, and/or each of their respective individual functions, routines, subroutines, or operations may be performed by one or more physical processors of the computer system executing the method. Two or more functions, routines, subroutines, or operations of the methods 400 and/or 500 may be performed in parallel or in an order which may differ from the order described above.

In one example, as illustrated by FIG. 4, method 400 may be performed by the host computer system 100 of FIG. 1, for processing paravirtualized IPoIB packets originated by a virtual machine running on the host computer system. The hypervisor executing on the host computer system may associate an IB interface of the host computer system with a paravirtualized IPoIB interface of a virtual machine running on the host computer system, as described in more details herein above. Responsive to receiving a paravirtualized IPoIB packet originated by a virtual machine executing on the host computer system, the latter may translate the paravirtualized IPoIB packet into an IPoIB frame and forward the frame via the IB interface to an IB switch or an external IB node.

Referring to FIG. 4, at block 410, a hypervisor executing on the host computer system may associate an IB interface of the host computer system with a paravirtualized IPoIB interface of a virtual machine running on the host computer system. As described in more details herein above, the hypervisor may associate the paravirtualized IPoIB interface with a virtual network interface which in turn may be associated with the IB interface. In one example, the virtual network interface may be exclusively associated with the IB interface. In another example, each of two or more virtual network interfaces may be exclusively associated with the respective IB interface of two or more IB interfaces of the host computer system.

At block 420, the hypervisor may receive, via the paravirtualized IPoIB interface, a paravirtualized IPoIB packet originated by the virtual machine. The paravirtualized IPoIB packet may comprise a payload represented by an IPv4 packet, IPv6 packet, address resolution protocol (ARP) packet, or Dynamic Host configuration Protocol (DHCP) packet. The paravirtualized IPoIB packet may further comprise a header including one or more IPoIB hardware addresses. In one example, the paravirtualized IPoIB packet may be addressed to another virtual machine running on the same host computer system or to an external computer system.

At block 430, the host computer system may translate the paravirtualized IPoIB packet into an IPoIB frame comprising the IP packet and a header including one or more of the IPoIB hardware addresses.

At block 440, the host computer system may forward the IPoIB frame, via the IB interface of the host computer system, to an IB switch or an external IB node, for consequent delivery to the destination address. Upon completing the operations referred to by block 430, the method may terminate.

In one example, as illustrated by FIG. 5, method 500 may be performed by the host computer system 100 of FIG. 1 for processing IPoIB frames received via an IB interface of the host computer system 100 and addressed to a virtual machine running on the host computer system 100. The hypervisor executing on the host computer system may associate an Infiniband interface with a paravirtualized IPoIB interface of a virtual machine running on the host computer system, as described in more details herein above. Responsive to receiving an IPoIB frame via an IB interface of the host computer system, the host computer system may translate the IPoIB frame into a paravirtualized IPoIB packet and forward the latter to the virtual machine via the paravirtualized IPoIB interface.

Referring to FIG. 5, at block 510, a hypervisor executing on the host computer system may associate an IB interface of the host computer system with a paravirtualized IPoIB interface of a virtual machine running on the host computer system. As described in more details herein above, the hypervisor may associate the paravirtualized IPoIB interface with a virtual network interface which in turn may be associated with the IB interface. In one example, the virtual network interface may be exclusively associated with the IB interface. In another example, each of two or more virtual network interfaces may be exclusively associated with the respective IB interface of two or more IB interfaces of the host computer system.

At block 520, the host computer system may receive, via the IB interface, an IPoIB frame addressed to the virtual machine. The IPoIB frame may contain a payload represented by an IPv4 packet, IPv6 packet, address resolution protocol (ARP) packet, or Dynamic Host configuration Protocol (DHCP) packet. The paravirtualized IPoIB packet may further comprise a header including one or more IPoIB hardware addresses. In one example, the paravirtualized IPoIB packet may be originated by another virtual machine running on the same host computer system or to an external computer system.

At block 530, the host computer system may translate the IPoIB frame into a paravirtualized IPoIB packet comprising the IP packet and a header including one or more of the IPoIB hardware addresses.

At block 540, the host computer system may forward the paravirtualized IPoIB packet, via the paravirtualized IPoIB interface, to the virtual machine. Upon completing the operations referred to by block 530, the method may terminate.

Figure 6:
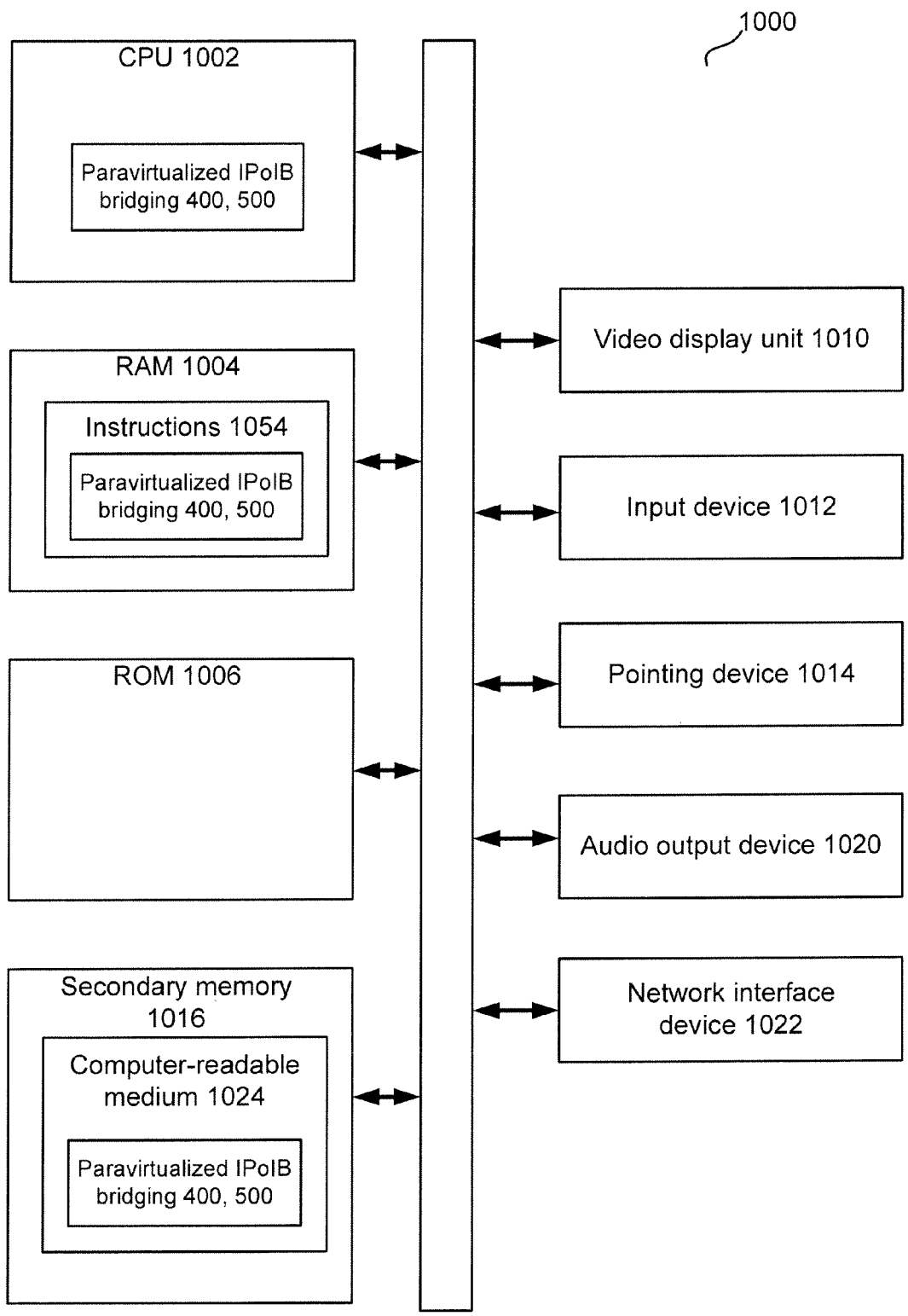
FIG. 6 depicts a block diagram of an illustrative computer system operating in accordance with one or more aspects of the present disclosure.

FIG. 6 depicts an example computer system 1000 which may perform any one or more of the methods described herein. In one example, computer system 1000 may correspond to host computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022 (e.g., an Infiniband host channel adapter). The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions 1054 encoding any one or more of the methods or functions described herein, including the example methods 400 and 500 for paravirtualized IPoIB bridging for virtual machines. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein, including the example methods 400 and 500 for paravirtualized IPoIB bridging for virtual machines. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the methods and/or each of their individual functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
    associating, by a hypervisor executing on a host computer system, an Infiniband (IB) interface of the host computer system with a paravirtualized Internet Protocol over Infiniband (IPoIB) interface of a virtual machine executing on the host computer system;
    receiving, by the paravirtualized IPoIB interface, a paravirtualized IPoIB packet originated by the virtual machine, the paravirtualized IPoIB packet comprising an IP packet and a first header including an IPoIB hardware address;
    translating, by a processor of the host computer system, the paravirtualized IPoIB packet into an IPoIB frame comprising the IP packet and a second header including the IPoIB hardware address; and
    forwarding the IPoIB frame by the IB interface to one of: an IB switch, or an external IB node.

2. The method of claim 1, wherein the associating comprises:
    associating the IB interface with a virtual network interface; and
    associating the virtual network interface with the paravirtualized IPoIB interface.

3. The method of claim 1, wherein the associating comprises exclusively associating the IB interface with the paravirtualized IPoIB interface.

4. The method of claim 1, further comprising:
    associating, by the processor of the host computer system, a second IB interface of the host computer system with a second paravirtualized IPoIB interface; and
    forwarding, by the processor of the host computer system, the IPoIB frame to the second paravirtualized IPoIB interface.

5. The method of claim 1, wherein the associating comprises communicating a queue pair number (QPN) and a global identifier (GID) of the IB interface to the virtual machine.

6. The method of claim 1 wherein the associating comprises communicating device capabilities of the IB interface to the virtual machine, the device capabilities comprising at least one of: a maximum transmission unit (MTU) or TCP segmentation offloading (TSO).

7. The method of claim 1, wherein the forwarding comprises forwarding the IPoIB frame using unreliable datagram (UD) mode or connected mode (CM), in view of one or more of: a size of the paravirtualized IPoIB packet, a checksum of the paravirtualized IPoIB packet, or a configuration parameter value.

8. The method of claim 1, wherein the IPoIB frame comprises a payload including one of an IPv4 packet, an IPv6 packet, an address resolution protocol (ARP) packet, or a Dynamic Host Configuration Protocol (DHCP) packet.

9. A method, comprising:
    associating, by a hypervisor executing on a host computer system, an Infiniband (IB) interface of the host computer system with a paravirtualized Internet Protocol over Infiniband (IPoIB) interface of a virtual machine executing on the host computer system;
    receiving, by the IB interface, an IPoIB frame addressed to the virtual machine, the IPoIB frame comprising an IP packet and a first header including an IPoIB hardware address;
    translating, by a processor of the host computer system, the IPoIB frame into a paravirtualized IPoIB packet comprising the IP packet and a second header including the IPoIB hardware address;
    forwarding the paravirtualized IPoIB packet to the virtual machine by the paravirtualized IPoIB interface.

10. The method of claim 9, wherein the associating comprises:
    associating the IB interface with a virtual network interface; and
    associating the virtual network interface with the paravirtualized IPoIB interface.

11. The method of claim 9, wherein the associating comprises exclusively associating the IB interface with the paravirtualized IPoIB interface.

12. The method of claim 9, wherein the forwarding comprises: triggering, by the hypervisor, an interrupt in the virtual machine.

13. The method of claim 9, wherein the associating comprises communicating a queue pair number (QPN) and a global identifier (GID) of the IB interface to the virtual machine.

14. The method of claim 9, wherein the associating comprises communicating device capabilities of the IB interface to the virtual machine, the device capabilities comprising at least one of: a maximum transmission unit (MTU) and TCP segmentation offloading (TSO).

15. The method of claim 9, wherein the IPoIB frame comprises a payload including one of: an IPv4 packet, an IPv6 packet, an address resolution protocol (ARP) packet, or a Dynamic Host Configuration Protocol (DHCP) packet.

16. A computer-readable non-transitory medium comprising executable instructions that, when executed by a processor, cause the processor to:
    associate, by the processor, an Infiniband (IB) interface of the computer system with a paravirtualized Internet Protocol over Infiniband (IPoIB) interface of a virtual machine executing on the computer system;
    receive, by the paravirtualized IPoIB interface, a paravirtualized IPoIB packet originated by the virtual machine, the paravirtualized IPoIB packet comprising an IP packet and a first header including an IPoIB hardware address;
    translate the paravirtualized IPoIB packet into an IPoIB frame comprising the IP packet and a second header including the IPoIB hardware address; and
    forward the IPoIB frame by the IB interface to one of: an IB switch, an external IB node.

17. The computer-readable non-transitory medium of claim 16, wherein to associate the IB interface with the paravirtualized IPoIB interface, the processor is further to:
associate the IB interface with a virtual network interface; and
associate the virtual network interface with the paravirtualized IPoIB interface.

18. The computer-readable non-transitory medium of claim 16, wherein to associate the IB interface with the paravirtualized IPoIB interface, the processor is further to:
exclusively associate the IB interface with the paravirtualized IPoIB interface.

19. The computer-readable non-transitory medium of claim 16, wherein the processor is further to:
associate a second IB interface of the computer system with a second paravirtualized IPoIB interface; and
forward the IPoIB frame to the second paravirtualized IPoIB interface.

20. The computer-readable non-transitory medium of claim 16, wherein to associate the IB interface with the paravirtualized IPoIB interface, the processor is further to:
communicate a queue pair number (QPN) and a global identifier (GID) of the IB interface to the virtual machine.

21. A system comprising:
a memory; and
a processor, coupled to the memory, to:
associate an Infiniband (IB) interface of a computer system with a paravirtualized Internet Protocol over Infiniband (IPoIB) interface of a virtual machine executing on the computer system;
receive, by the paravirtualized IPoIB interface, a paravirtualized IPoIB packet originated by the virtual machine, the paravirtualized IPoIB packet comprising an IP packet and a first header including an IPoIB hardware address;
translate the paravirtualized IPoIB packet into an IPoIB frame comprising the IP packet and a second header including the IPoIB hardware address; and
forward the IPoIB frame by the IB interface to one of: an IB switch, an external IB node.

22. The system of claim 21, wherein to associate the IB interface with the paravirtualized IPoIB interface, the processor is further to:
associate the IB interface with a virtual network interface; and
associate the virtual network interface with the paravirtualized IPoIB interface.

23. The system of claim 21, wherein to associate the IB interface with the paravirtualized IPoIB interface, the processor is further to:
exclusively associate the IB interface with the paravirtualized IPoIB interface.

24. The system of claim 21, wherein the processor is further to:
associate a second IB interface of the computer system with a second paravirtualized IPoIB interface; and
forward the IPoIB frame to the second paravirtualized IPoIB interface.

25. The system of claim 21, wherein to associate the IB interface with the paravirtualized IPoIB interface, the processor is further to:
communicate a queue pair number (QPN) and a global identifier (GID) of the IB interface to the virtual machine.

* * * * *